(12) United States Patent
Hamada et al.

(10) Patent No.: US 6,997,369 B2
(45) Date of Patent: Feb. 14, 2006

(54) FRICTION STIR WELDING METHOD

(75) Inventors: Koji Hamada, Kudamatsu (JP); Ryoji Ishida, Yamaguchi (JP); Masakuni Ezumi, Hofu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/762,359

(22) Filed: Jan. 23, 2004

(65) Prior Publication Data

US 2004/0195293 A1 Oct. 7, 2004

(30) Foreign Application Priority Data

Apr. 1, 2003 (JP) .................................... 2003-098034

(51) Int. Cl.
*B23K 20/12* (2006.01)

(52) U.S. Cl. .................. 228/112.1; 228/2.1; 228/103
(58) Field of Classification Search .................... 228/8, 228/103, 2.1, 112.1
See application file for complete search history.

(56) References Cited

U.S. PATENT DOCUMENTS

| | | | | | |
|---|---|---|---|---|---|
| 6,311,889 | B1 | * | 11/2001 | Ezumi et al. | 228/112.1 |
| 6,474,533 | B1 | * | 11/2002 | Ezumi et al. | 228/112.1 |
| 6,530,513 | B2 | * | 3/2003 | Ezumi et al. | 228/112.1 |
| 6,659,330 | B2 | * | 12/2003 | Ezumi et al. | 228/112.1 |
| 6,705,508 | B2 | * | 3/2004 | Ezumi et al. | 228/112.1 |
| 6,719,184 | B2 | * | 4/2004 | Ishida et al. | 228/112.1 |
| 6,857,555 | B2 | * | 2/2005 | Ishida et al. | 228/112.1 |
| 2002/0092888 | A1 | * | 7/2002 | Ezumi et al. | 228/112.1 |
| 2002/0092889 | A1 | * | 7/2002 | Ezumi et al. | 228/112.1 |
| 2002/0092890 | A1 | * | 7/2002 | Ezumi et al. | 228/112.1 |
| 2002/0108740 | A1 | * | 8/2002 | Hidaka et al. | 165/135 |
| 2002/0125298 | A1 | * | 9/2002 | Ezumi et al. | 228/112.1 |
| 2003/0192941 | A1 | * | 10/2003 | Ishida et al. | 228/112.1 |
| 2004/0194942 | A1 | * | 10/2004 | Okamoto et al. | 165/170 |
| 2004/0195293 | A1 | * | 10/2004 | Hamada et al. | 228/103 |
| 2004/0197159 | A1 | * | 10/2004 | Ishida et al. | 409/134 |
| 2004/0211819 | A1 | * | 10/2004 | Ezumi et al. | 228/112.1 |
| 2005/0011933 | A1 | * | 1/2005 | Grong | 228/165 |

FOREIGN PATENT DOCUMENTS

| | | | | |
|---|---|---|---|---|
| EP | 1224998 | A2 | * | 7/2002 |
| EP | 1354661 | A2 | * | 10/2003 |
| JP | 11090655 | | * | 4/1999 |
| JP | 02002210571 | A | * | 7/2002 |
| JP | 02003154473 | A | * | 5/2003 |
| JP | 02993311439 | A | * | 11/2003 |
| JP | 02004261859 | A | * | 9/2004 |
| JP | 02004298955 | A | * | 10/2004 |

OTHER PUBLICATIONS

European Search Report mailed Jun. 21, 2005, for EP 04 25 0355.

* cited by examiner

*Primary Examiner*—Kiley S. Stoner
(74) *Attorney, Agent, or Firm*—Antonelli, Terry, Stout & Kraus, LLP

(57) ABSTRACT

Two members 11 and 12 are butted against each other, and the butted portion is cut with a cutter 20 to form a slit 14 thereto, and a filler member 21 is inserted to slit 14 using rollers 22, 23 and 25. Then, friction stir welding is performed to weld filler member 21 and two member 11 and 12 disposed on both sides thereof using a rotary tool 35, and the position of a gap formed between an end of filler member 21 at the upstream side in the rotating direction of rotary tool 35 and one member 11b at the upstream side in the rotating direction is detected using an optical sensor 35. Then, half the width of filler member 21 is added to the detected position, and the calculated position is set as the position of the rotary tool 35.

3 Claims, 1 Drawing Sheet

FRICTION STIR WELDING METHOD

FIELD OF THE INVENTION

The present invention relates to a friction stir welding method for welding butted areas.

DESCRIPTION OF THE RELATED ART

The friction stir welding method for welding butted areas involves, as disclosed in Japanese Patent Application Laid-Open No. H11-90655 and U.S. Pat. No. 6,474,533, providing a protrusion to a pair of members being butted, inserting a rotating rotary tool from the side having the protrusion, moving the rotary tool along a joint line, and thereby friction stir welding the butted members. The metal constituting the protrusion is moved into the gap formed between the pair of butted members, filling the gap. In order to do so, the width of the gap must be detected, and the center of the rotary tool must be positioned to correspond to the center of width of the gap.

Furthermore, Japanese Patent Application Laid-Open No. 2002-210571 and European Patent Application Laid-Open No. 1224998A2 discloses cutting a slit to the pair of butted members along the gap at the butted portion, inserting a strip-shaped filler member to the gap formed by the cutting, and performing friction stir welding of the butted area of the two members and the filler member.

In this disclosure, however, there is no explanation on how the position for inserting the rotary tool is determined.

SUMMARY OF THE INVENTION

The object of the present invention is to provide a method for computing the position for inserting the rotary tool when a filler member is inserted to the gap formed between the members to be welded.

The above object is achieved by butting two members against one another, cutting the butted portion to provide a slit thereto, inserting a filler member to the slit, and performing friction stir welding of the filler member and the two members on both sides of the filler material using a rotary tool, wherein the position of the rotary tool is determined by detecting the position of a gap formed between an end portion of the filler member at an upper stream side with respect to a rotating direction of the rotary tool and one of said members at the upper stream side in the rotating direction of the rotary tool, and adding half the width of the filler member to that position.

DETAILED DESCRIPTION OF THE PREFERRED EMBODIMENT

Figure 1:
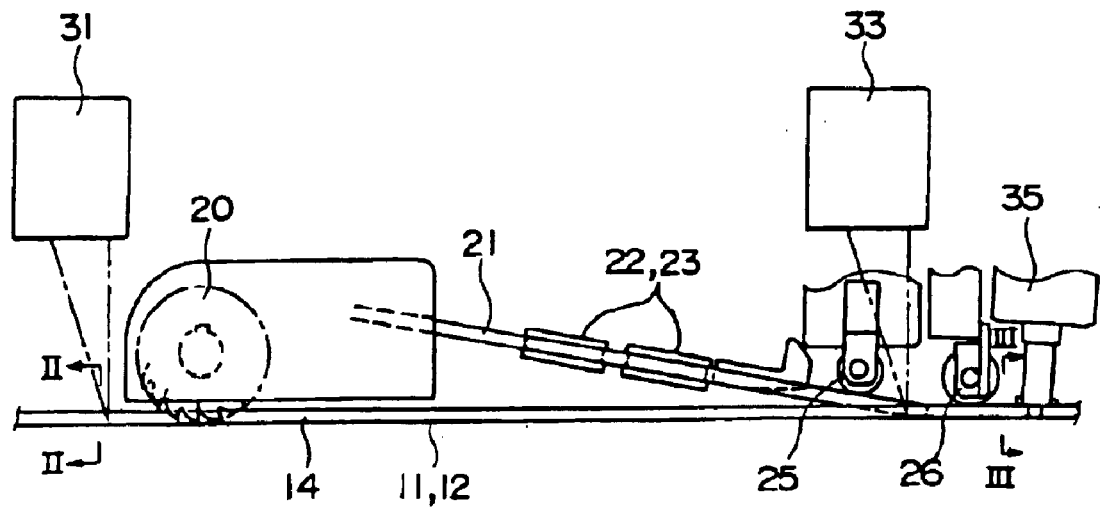
FIG. 1 is a vertical cross-sectional view showing the midstream of the friction stir welding method according to one embodiment of the present invention.
Figure 2:
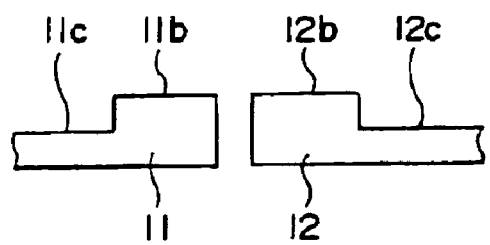
FIG. 2 is a cross-sectional view taken at II—II of FIG. 1.
Figure 3:
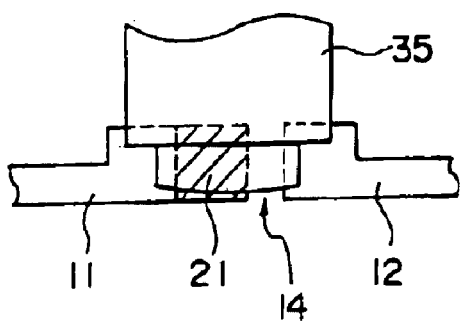
FIG. 3 is a cross-sectional view taken at III—III of FIG. 1.

One preferred embodiment of the present invention will be explained with reference to FIGS. 1 through 3. FIG. 3 shows a rotary tool 35 together with the members being welded.

As is disclosed in Patent Document 2, two members 11 and 12 are butted against each other, and the butted portion is cut with a slit cutter 13 to provide a slit 14 thereto, then a strip-like filler member 21 is inserted to the slit 14. The width of the filler member 21 is somewhat smaller than the width of the slit 14. Reference numbers 22 and 23 denote rollers for guiding the filler member 21 wound around a reel (not shown) Reference numbers 25 and 26 show rollers for holding down the filler member 21 inserted to the slit 14. Members 11 and 12 and the filler member 21 are made of aluminum alloy.

The end portions of the members 11 and 12 at the butted portion have increased thickness, and protrusions 11b and 12b are formed. Protrusion 11b and protrusion 12b are butted against each other. Protrusions 11b and 12b project upward from upper surfaces 11c and 12c of members 11 and 12.

The three members, which are the filler member 21 inserted to the slit and the butted members 11 and 12, are friction stir welded using a rotary tool 35 disposed somewhat behind the roller 25. As explained, the friction stir welding is performed while cutting a slit 14 to the butted portion with a cutter. The diameter of a small-diameter portion disposed at the tip of the rotary tool 35 is larger than the width of the gap, and is partially placed over the filler member 21 and protrusions 11b, 12b. The filler member 21 right before the rotary tool 35 is not disposed at the center of the groove but is biased toward the lower stream side in the rotating direction of the rotary tool 35, so the filler member 21 is in contact with one of the protrusions 11b or 12b.

Optical sensors 31, 33 are disposed ahead of the rotary tool 35. The optical sensors 31 and 33 are for scanning the filler member 21, the upper surfaces of the protrusions 11b and 12b, and the upper surfaces of the members 11c and 12c. The optical sensor 31 is for determining the center position of the cutter 20. The width of the pair of protrusions 11b and 12b is determined, and the center of the width is set as the center position of the cutter 20. Thus, the cutter will cut only the butted portions.

The optical sensor 33 is for determining the center position of the rotary tool 35. At the downstream side (the portion where friction stir welding is not yet performed) of the direction of movement of the rotary tool 35 (which moves from right to left in FIG. 1), the optical sensor 33 determines the position of the gap formed between the end portion of the filler member 21 at the upstream side with respect to the rotating direction of the rotary tool 35 and one member 12b at the upstream side in the rotating direction. This is because by the rotation of the rotary tool 35, the filler member 21 is biased toward the downstream side in the rotating direction of the rotary tool 35. Then, half the width of the filler member 21 which is already known is added to the detected position of the gap, and the calculated position is output to the rotary tool 35 as the center position for the rotary tool 35. If gaps are found on both sides of the filler member 21, the center position for the rotary tool 35 can be computed based on both gaps.

Further, the position of the upper surfaces of members 11c and 12c, and the position of the upper surfaces of protrusions 11b and 12b are sought. Based on these positions, the position of the boundary area between the small-diameter portion and the large-diameter portion of the rotary tool 35, in other words, the amount of insertion of the rotary tool 35, is computed. According thereto, since the boundary area is not disposed below the upper surfaces 11c and 12b, the upper surfaces 11c and 12c can be smoothed if the protrusions 11b and 12b are removed by cutting.

According to this arrangement, the cutting position is determined based on the input from the optical sensor 31, and cutting is carried out thereafter. Next, the position of the filler member is detected by the optical sensor 33, based on which the inserting position and depth of the rotary tool 35 is computed, and friction stir welding is carried out.

What is claimed is:

1. A friction stir welding method comprising:

butting two members against each other and cutting the butted portion to form a slit thereto;

inserting a filler member to said slit;

friction stir welding said filler member and said two members on both sides of said filler member using a rotary tool; and detecting a position of a gap formed between an end portion of said filler member at an upstream side with respect to a rotating direction of said rotary tool and one of said members at the upstream side in the rotating direction, adding half a width of said filler member to said position, and setting the calculated position as the position of said rotary tool.

2. The friction stir welding method according to claim 1, wherein the position of said gap formed between the end portion of said filler member at the upstream side and one of said members at the upstream side in the rotating direction corresponds to the position of the end portion of said filler member.

3. The friction stir welding method according to claim 2, wherein the position of the end portion of said filler member at the upstream side is sought by carrying out a scan from the upstream side toward the downstream side.

* * * * *